United States Patent Office 2,914,967
Patented Dec. 1, 1959

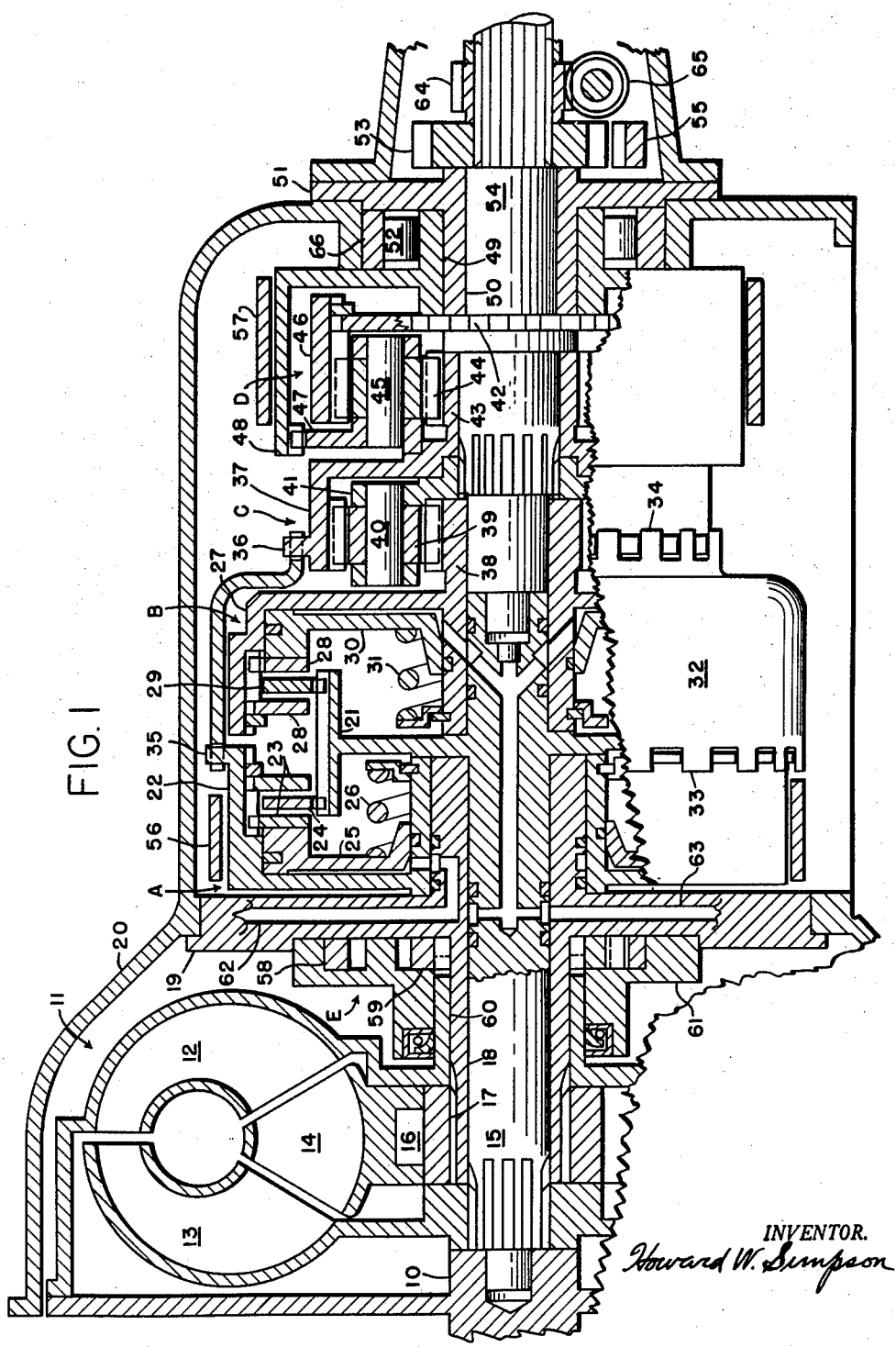

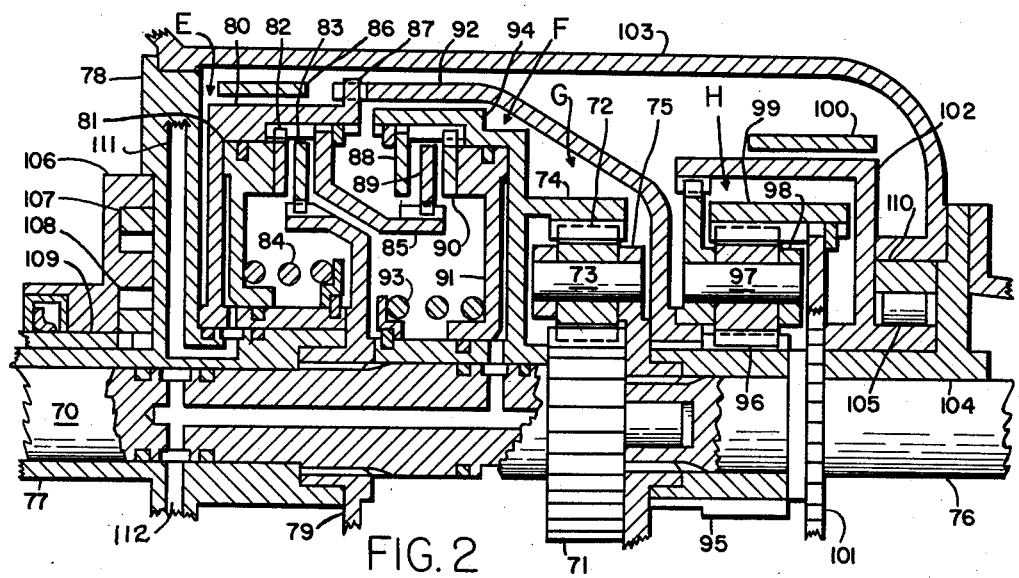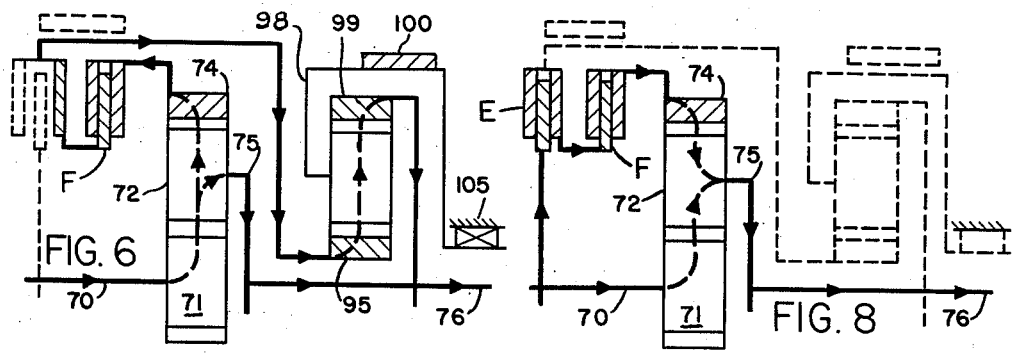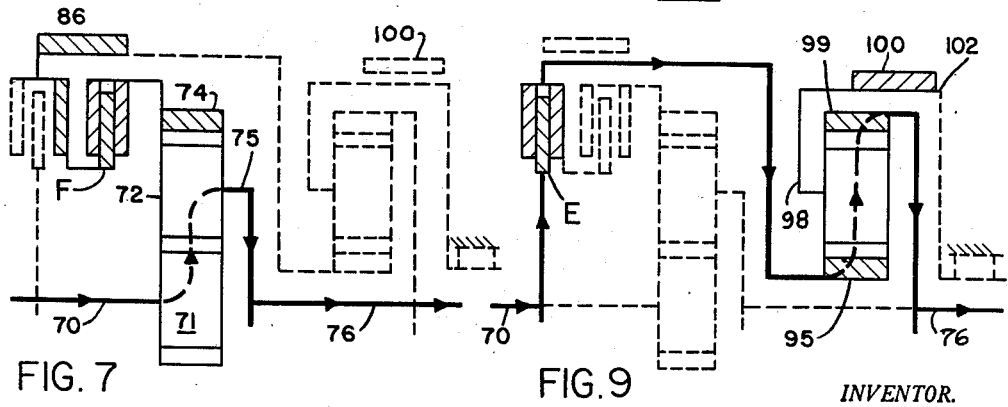

2,914,967

PLANETARY TRANSMISSION

Howard W. Simpson, Dearborn, Mich., assignor of one-third to General Motors Corporation, Detroit, Mich., a corporation of Delaware Application August 20, 1956, Serial No. 605,019

22 Claims. (Cl. 74—759)

This invention refers to planetary transmission, particularly to those having three speeds forward and one reverse and with a large ratio spread between low and high speed.

Tractors and other off-road vehicles require a large reduction in low gear for very slow movement under heavy load. To obtain a low ratio of 7 to 1 or more usually requires a compound gear train or very large gears, but in the present invention the gears consist of two simple planetary gear sets of small diameter.

These gears are combined with two clutches, two brakes for holding reaction members and preferably but not mandatory, a one-way brake which acts as a supplemental holding brake.

In the embodiments of the invention shown the function of the gearing is identical. Only the location of the clutches differs in the five arrangements.

In planetary transmissions of the type shown the following characteristics are desirable.

(1) Low clutch plate differential r.p.m. (when the clutches are open or released) to reduce heat and drag torque loss.

(2) Clutches to transmit as little torque as possible in order to keep the cost of the clutch to a minimum.

(3) Low planet gear speeds, when working and also when idling, to reduce noise and permit good lubrication.

(4) Clutches to have large heat dissipating capacity.

These characteristics conflict, thus making it impossible to obtain all in a given transmission. Therefore the five embodiments shown are compromises in which one or two of the above advantages are obtained (due to the position of the clutches) at the expense of the others. An unusual characteristic of this gear train is that two clutches can be used to couple the gear members in several different ways.

In general it is advisable from the standpoint of low drag loss and heating of the oil to choose the clutch locations which impose the largest possible torque on them in order to obtain the slowest possible planet gear r.p.m. and low clutch plate differentials and one of the present disclosures is such. In the four other embodiments the clutch torques are reduced in varying degrees accompanied by varying degrees of increased planet gear r.p.m. and greater clutch plate differential speeds, thus providing five choices of structure.

Due to the large ratio spread obtained in this combination, it may be advisable in some cases to use a splitter gear in combination to provide smaller steps and to double the number of speeds obtained.

Also a fluid torque converter could be used as shown in one embodiment but this is optional. A master clutch of the friction type may also be used.

A one-way brake is used to hold the low speed reaction member. This construction is possible only in rare gear trains in which the reaction member never rotates backwardly in any forward or reverse speed or in neutral. This permits an automatically timed smooth pick-up shift from low to second speed and this is one object of this invention.

The two gear sets used are so-called simple planetary sets with several planet gears, each meshing only with a ring gear and a sun gear and with all the gears in the same radial plane.

Another object of this invention is to provide a transmission with a large spread of gear ratios without the use of compound gears or large diameter gears.

Another object is to provide a transmission in which low speed is obtained by coupling two simple gear sets in differential relationship to provide a parallel torque path with torque delivery to an output shaft from both gear sets simultaneously.

Another advantage is to provide a transmission in which the gear tooth loads are the same in both low and second speed in the gear set which is working in both of these speeds.

Another advantage is to provide a versatile gear combination in which two clutches are combined with two simple gear sets in five different ways. Other objects and advantages of my invention will appear in the accompanying specification and claims.

Fig. 1 is a partial side elevation in section of one embodiment of my invention in which a fluid torque converter is shown as a master clutch and two friction clutches are used to couple the converter output to various gear members.

Fig. 2 is also a partial side elevation in partial section without the converter and with a different arrangement of friction clutches.

Figure 3:
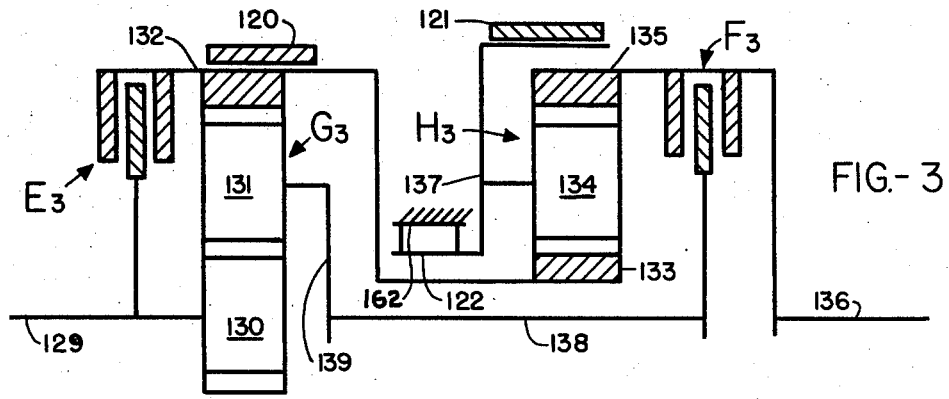
Figure 4:
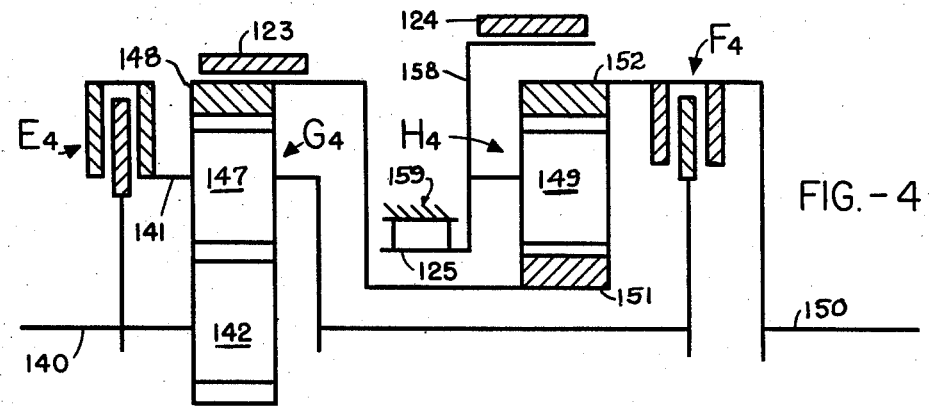
Figure 5:
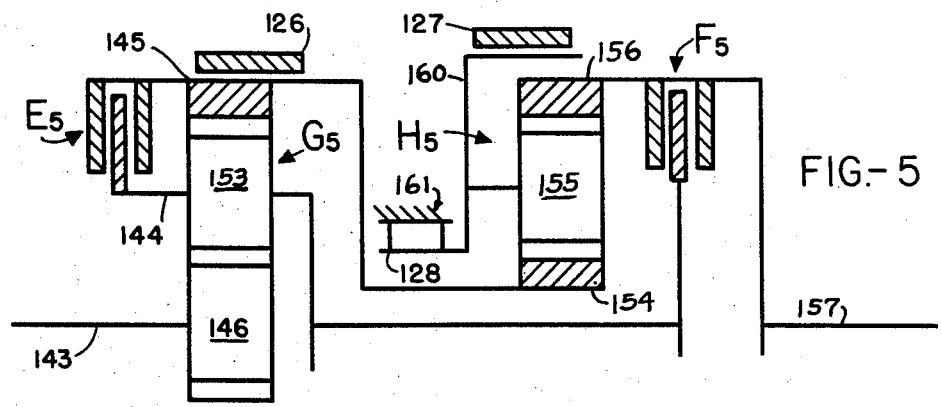

Figs. 3, 4 and 5 are diagrammatic partial side elevations in section of the same gear train but with both friction clutches located differently than in Figs. 1 and 2 but with one of the clutches the same in Figs. 3, 4 and 5.

Figs. 6 to 9 are diagrams showing the gears, clutches and brakes which are working and the torque paths in low, second, third and reverse speeds respectively.

In Figs. 6 to 9 members that are working are shown in full lines and are cross sectioned and the parts that are idling are shown in dotted lines.

In Fig. 1 engine shaft 10 drives pump 12 of converter 11. Turbine 13 drives input shaft 15 and stator 14 is held by one-way clutch 16 on ring 17 which is splined to hub 18 of flange 19 which is attached to housing 20. Shaft 15 drives clutch drum 21 and sliding clutch plates 24 and 29. Clutch A consists of housing 22 rotatably supported on flange 19, clutch plates 23 which are splined to housing 22 and piston 25 which is actuated by oil under pressure through opening 62 and is retracted when not under pressure by spring 26.

Drum 32 has teeth 33 meshing with splines 35 on housing 22 and teeth 34 meshing with teeth 36 on sun gear 37 thus driving integral ring gear 37 and sun gear 43.

Clutch B has housing 27 integral with sun gear 38 and is rotatably mounted partly on input shaft 15 and output shaft 54.

Clutch plates 28 are splined to housing 27 and piston 30 engages these plates with clutch plate 29 by means of oil under pressure through passage 63.

Spring 31 retracts piston 30.

Gear set C consists of sun gear 38, ring gear 37 and several planet gears, one of which, 39, is shown mounted on pin 40 which is fixed in carrier 41.

Gear set D consists of sun gear 43 which is rotatably mounted on output shaft 54, ring gear 46 and several planet gears, one of which, 44, is rotatably mounted on pin 45 fixed in carrier 47.

Carrier 41 is splined to output shaft 54 and ring gear 46 is also attached to output shaft 54 at its splined flange 42. Brake drum 48 is splined to carrier 47 and is rotatably mounted on hub 50 of flange 51. One-way brake 52 is between hub 49 and ring 66 which is fixed in housing 20. Parking gear 53 is splined to output shaft 54 and can be locked by detent 55. Gears 64 and 65 are for speedometer and governor drive.

Brake band 56 is operated by a hydraulic servo not shown to hold clutch housing 22, ring gear 37 and sun gear 43 against rotation.

Brake band 57 operates to hold carrier 47 against rotation in either direction while one-way brake 52 is biased to hold carrier 47 against backward rotation only. Pump E has gears 58 and 59 running in housing 61 and supplies oil under pressure to operate the clutches and brake bands. Pump E is driven by a tongued sleeve 60 which fits in slots in gear 59.

In Fig. 2 gear set G comprises sun gear 71 which is integral with input shaft 70, ring gear 74 and several planet gears, one of which, 72, is rotatably mounted on pin 73 which is fixed in carrier 75.

Gear set H comprises sun gear 95, ring gear 99 and several planet gears, one of which, 96, is rotatably mounted on pin 97 fixed in carrier 98.

Clutch E has housing 80, sliding clutch plates 82 and 83, pressure plate 85, piston 81, retracting spring 84, and is driven by drum 79 which is splined to input shaft 70. Clutch F comprises housing 94 integral with ring gear 74, sliding clutch plates 89 and 90, pressure plate 88, piston 91 and retracting spring 93. Clutches E and F are engaged by oil pressure through passages 111 and 112 respectively. Oil pump gears 107 and 108 are driven by sleeve 109 and are located in pump housing 106. Oil under pressure is led to suitable control mechanism for operating clutches E and F and brake bands 86 and 100.

Carrier 75 is splined to output shaft 76 and ring gear 99 is splined to the flange 101 of output shaft 76. Sun gear 95 is rotatably mounted on output shaft 76 and is splined to drum 97 which has slots engaging clutch housing 80 at projecting teeth 87.

Brake drum 102 is splined to carrier 98 and is free to rotate on hub 104 which is fixed to housing 103. One-way brake 105 is located between brake drum 102 and ring 110 which is fixed in housing 103. Brake drum 80 is free to rotate on the hub of flange 78 which is fixed to housing 103.

For maximum clarity Figs. 1 and 2 are in simplified form. Also many small parts such as screws, bushings and washers are omitted. Some parts shown as being integral with others could be made up of 2 or more parts and attached together if this were advisable for manufacturing.

In Fig. 6, low speed, input shaft 70 drives sun gear 71 and planet gears 72 mesh with both ring gear 74 and sun gear 71. Ring gear 74 drives sun gear 95 through clutch F which is shown engaged. Output shaft 76 is driven by both carrier 75 and ring gear 99. Carrier 98 is held by brake band 100 and one-way brake 105. Arrows show the torque paths.

In Fig. 7, second speed, input shaft 70 again drives sun gear 71 and clutch F remains engaged but ring gear 74 is now held stationary by brake band 86, brake band 100 being released. Carrier 75 drives output shaft 76 as in low speed.

In Fig. 8, direct drive, both clutches E and F are engaged which locks up the gear train in direct drive.

In Fig. 9, reverse, clutch E is engaged and sun gear 95 is driven at input speed. Ring gear 99 drives output shaft 76 backward due to carrier 98 being held stationary by brake band 100.

In Fig. 3 gear set G3 consists of sun gear 130 driven by input shaft 129, planet gears 131, carrier 139 and ring gear 132. Gear set H3 consists of sun gear 133 connected to ring gear 132, planet gears 134, carrier 137 and ring gear 135 which is connected to output shaft 136. Carrier 139 can be coupled to output shaft 136 by clutch F3. Input shaft 129 can be coupled to ring gear 132 by clutch E3.

Brake bands 120 and 121 are adapted to hold ring gear 132 and carrier 137 respectively. One-way brake 122 is between carrier 137 and transmission case 162 and is biased to prevent backward rotation of carrier 137.

In Fig. 4 gear set G4 consists of sun gear 142 integral with input shaft 140, planet gears 147, ring gear 148, and carrier 141 which can be coupled to output shaft 150 by clutch F4. Gear set H4 consists of sun gear 151 which is integral with ring gear 148, planet gears 149, carrier 158, and ring gear 152 which is integral with output shaft 150.

Brake bands 123 and 124 are adapted to hold sun gear 148 and carrier 158 respectively. Clutch E4 is adapted to couple input shaft 140 to carrier 141. One-way brake 125 is located between carrier 158 and stationary transmission case 159, and is biased to prevent backward rotation of carrier 158 at all times.

In Fig. 5 gear set G5 consists of sun gear 146 integral with input shaft 143, planet gears 153, carrier 144 and ring gear 145. Gear set H5 consists of sun gear 154 which is integral with ring gear 145, planet gears 155, carrier 160 and ring gear 156 which is connected to output shaft 157. Brake bands 126 and 127 are adapted to hold ring gear 145 and carrier 160 respectively. Clutch E5, when engaged, couples carrier 144 to ring gear 145. Clutch F5, when engaged, couples carrier 144 to output shaft 157. One-way brake 128 is between carrier 160 and fixed stationary housing 161 and is biased to prevent backward rotation of carrier 160.

*Operation Fig. 1*

In neutral both clutches and brakes are released and input shaft 15 together with clutch plates 24 and 29 are rotated by converter 11.

In low, clutch B is engaged which drives sun gear 38 forward. The reaction of the load of output shaft 54 tends to hold carrier 41 stationary so that ring gear 37 and sun gear 43 turn backward and this tends to turn carrier 47 backward but one-way brake 52 prevents this and holds it stationary. This forces ring gear 46, carrier 41 and output shaft 54 to turn forward at low speed. Brake band 57 is also applied but only for the purposes of preventing free-wheeling of the vehicle when coasting and application of brake band 57 is not necessary to obtain a low speed drive. In low speed part of output torque is transmitted to output shaft 54 by carrier 41 and the remainder by ring gear 46.

In second speed clutch B remains engaged but brake band 56 is applied instead of brake band 57. This holds ring gear 37 as a reaction member and forces 41 and output shaft 54 to turn at reduced speed, but since ring gear 37 is now stationary, output shaft speed is faster than in low gear when ring gear 37 was turning backward. Gear set D now idles forward slowly and one-way brake 52 overruns.

In third speed clutches A and B are engaged and brake band 56 is released. This locks the gearing in direct drive.

In reverse clutch A and brake band 57 are engaged. Sun gear 43 rotates forward and carrier 47 being held, is the reaction member thus forcing ring gear 46 and output shaft 54 backward.

*Operation Figs. 2, 6, 7, 8 and 9*

In neutral clutches E and F and brake bands 86 and 100 are all released and input shaft 70 drives sun gear 71 forward and since carrier 75 is held stationary by the load on output shaft 76, ring gear 74 turns slowly backward.

In low, shown in Fig. 6, clutch F engages thus coupling ring gear 74 to sun gear 95 which tends to turn carrier 98 backward. This is prevented by one-way brake 105 so that ring gear 99 and output shaft 76 are forced to turn forward at reduced speed. Brake band 100 is applied to prevent overrun of one-way brake 105 due to torque reversal.

In second, brake band 100 is released and brake band 86 is applied with clutch F remaining engaged as shown in Fig. 7. Ring gear 74 is the reaction member and carrier 75 is driven at reduced speed but since ring gear 74 is stationary instead of turning backward as in low speed, output shaft 76 rotates somewhat faster than when the transmission is in low speed.

In third speed only clutches E and F are engaged as shown in Fig. 8. This locks the gearing up in direct drive.

In reverse, Fig. 9, clutch E and brake band 100 are engaged. Sun gear 95 is then driven at input speed which tends to rotate carrier 98 forward but this is prevented by brake band 100 and ring gear 99 and output shaft 76 are forced to turn backward at reduced speed.

In Figs. 1 to 9 the various gears of each set are shown as being equal in diameter but this is not mandatory. For instance, if ring gears 37 and 46 in Fig. 1 each have 90 teeth, sun gear 38 has 60 teeth and sun gear 43 has 30 teeth the gear ratios would be 7.0, 2.5 and 1.0 to 1 for low, second and direct drive. If an overdrive splitter having a ratio of .60 is used in conjunction with such a gear combination the resulting 6 reduction ratios would be, 7.0, 4.2, 2.5, 1.5, 1.0 and .60 to 1. Typical road speeds for a wheeled tractor corresponding to these gear ratios would be 1.1, 1.9, 3.1, 5.2, 7.8 and 13.0 miles per hour. Reverse ratio would be 3 to 1, or 2.6 miles per hour. Reduction ratios numerically much larger than above are obtainable by varying the number of teeth.

Clutch A in Fig. 1 transmits the same torque as clutch E in Fig. 2, and both have the same plate differential when open as in low and 2nd speed.

Clutch B in Fig. 1 transmits only a fraction of that carried by clutch F in Fig. 2. This advantage is more than offset by the fact that the plate differential of clutch B is much higher in reverse. Besides planet gears 39 idle much faster when not working in reverse than do planet gears 72 in Fig. 2.

Therefore embodiment shown in Fig. 2 would appear to be preferable even though clutch F must have greater torque carrying capacity.

If a still lower plate differential in reverse than that of clutch F in Fig. 2 is desired, this clutch can be located as shown at F3 in Fig. 3, and Figs. 4 and 5 are the same in this respect. In this location however, clutches F3, F4 and F5 carry more torque than clutch F in Fig. 2.

Clutch E3 in Fig. 3 carries the same torque when engaged and has the same plate differential when disengaged as do clutches A and E in Figs. 1 and 2 respectively.

Clutch E4 in Fig. 4 carries more torque than clutches A, E and E3 in Figs. 1, 2 and 3 but has a lower plate differential when released, i.e. in low and 2nd speed.

Clutch E5 in Fig. 5 carries more torque than clutch E4 in Fig. 4 but has a still lower plate differential than that of clutch E4 in Fig. 4.

The above comparisons assume that the gear sets in Figs. 1 to 5 are identical as to number of teeth.

*Operation Fig. 3*

Input shaft 129 drives sun gear 130 and clutch F3 is engaged in all forward speeds. One-way brake 122 holds carrier 137 in low and carrier 139 and ring gear 135 are driven at output speed with their individual torques added to produce low speed output torque. Ring gear 132 and sun gear 133 turn backward. Brake band 121 prevents overrun of carrier 137.

In second speed brake band 121 is released and brake band 120 engaged which holds ring gear 132 as a reaction member. Even though brake band 121 is released, one-way brake 122 continues to hold carrier 137 as a reaction member until ring gear 130 stops rotating backward at which time one-way brake 122 automatically unlocks carrier 137 to turn forward.

In third speed both clutches E3 and F3 are engaged which locks the gears to rotate as a unit. In reverse, clutch F3 is released and clutch E3 and brake band 121 are engaged. Sun gear 133 is driven forward and ring gear 135 and output shaft 136 are thus driven backward.

*Operation Figs. 4 and 5*

This is the same as in Fig. 3. Clutches E4 and E5 perform the same function as clutch E3, i.e. to lock up gear sets G3, G4 and G5 respectively by locking two of the three members of the above gear sets together. The difference is that torque transmitted by clutches E3, E4 and E5 varies as described under operation of Figs. 2, 6, 7, 8 and 9.

While preferred embodiments have been described above in detail, it will be understood that numerous modifications might be resorted to without departing from the scope of my invention as defined in the following claims.

I claim:

1. A variable speed transmission for an automotive vehicle comprising a housing, axially aligned power input and power output members, first and second axially aligned planetary gear sets interposed between said members, said gear sets each having interengaging sun, ring and planet gears and a planet gear carrier, means for effecting two different forward speed ratios between said input and output members, said means including a clutch, a one-way brake, and a brake connection adapted upon successive operation to provide a first forward reduction ratio at which time said clutch is engaged to drive the sun gear of the first of said gear sets at input speed, the second ring gear and the first carrier are driven at output speed, the first ring gear and second sun gear rotate cojointly, and the second carrier is held against reverse rotation only by said one-way brake; and a second forward reduction ratio is effected upon (only) operation of said brake connection to hold said cojointly rotatable ring and sun gear stationary, the clutch remaining engaged, and the second carrier being freed by said one-way brake for forward rotation.

2. A variable speed transmission for an automotive vehicle comprising a housing, axially aligned power input and power output members, a pair of axially aligned planetary gear sets interposed between said members, said gear sets each having interengaging sun, ring and planet gears, and a planet gear carrier, means for effecting two different forward speed ratios between said input and output members, said means including a clutch, a one-way brake, and a brake connection adapted upon successive operation to provide a first forward reduction ratio at which said clutch is engaged to drive the first of said sun gears at input speed, the second ring gear and the first carrier are driven at output speed, the first ring gear and second sun gear rotate cojointly, and the second carrier is held against reverse rotation only by said one-way brake; and a second forward reduction ratio is effected upon (only) operation of said brake connection to hold said first ring gear and second sun gear stationary, the clutch remaining engaged, and the second carrier being freed by said one-way brake for forward rotation, and an additional friction brake connection for said second carrier, said brake connection being adapted for use to provide a two-way brake for said second carrier when a reversion torque drive in first reduction ratio is desired.

3. A variable speed transmission for an automotive vehicle comprising a housing, axially aligned power input and power output members, first and second axially aligned planetary gear sets interposed therebetween each having rotatable interengaging sun, ring and planet gears, and a planet gear carrier, means for effecting a plurality of drive ratios between said input and output members, said means including first and second selectively engageable clutches and a plurality of brake connections, said brake connections including a one-way brake for holding the carrier of the second gear set against reverse movement only, and a two-way brake for holding said second carrier against movement in either direction, said clutches and brake connections being adapted upon successive operation to provide a first forward reduction ratio with the first clutch engaged and the other released wherein the sun gear of the first gear set is driven at input speed and the ring gear of the second set at output speed, the carrier of the second set is held stationary against reverse movement by said one-way brake and the other carrier rotates with the output member and wherein the ring gear of the first set and sun gear of the second set rotate together; a second forward reduction ratio with said first clutch engaged and the other released wherein free forward movement of such stationary carrier is accommodated by said one-way brake and the ring gear of the first set is held stationary; a forward direct drive ratio with both of said clutches engaged wherein both planetary sets are locked up; and a reverse reduction ratio, wherein the carrier of the second gear set is held stationary by said two-way brake, the sun gear of the second set is driven at input speed by the second clutch and the ring gear rotates at output speed.

4. A variable speed transmission for an automotive vehicle comprising a housing, axially aligned power input and power output members, a pair of axially aligned planetary gear sets interposed therebetween, each having rotatable interengaging sun, ring and planet gears and a planet gear carrier, means for effecting three progressive forward drive ratios between said input and output members, said means including two selectively gradually engageable clutches and a plurality of brake connections, including a one-way brake for one of said carriers, said clutches and said brake connections being adapted upon successive operation to provide a forward direct drive ratio with both clutches engaged wherein both planetary sets are locked up by simultaneously connecting said input member to both of said sun gears wherein only one of said clutches is engaged in all forward speeds thereby connecting said input member to one of said sun gears.

5. A variable speed transmission for an automotive vehicle comprising a housing, axially aligned power input and power output members, a pair of axially aligned planetary gear sets interposed therebetween each having a concentrically rotatable interengaging sun, ring and planet gears and a planet gear carrier, means for effecting a plurality of drive ratios between said input and output members, said means including two selectively engageable clutches and a plurality of brake connections including a one-way brake connection for one of said carriers, said clutches and said brake connections being adapted upon successive operation to provide a first forward reduction ratio with a first of said clutches engaged and the second released wherein the sun gear of the first gear set is driven at input speed and the ring gear of the second set at output speed, the carrier associated with the output ring is held stationary against reverse rotation by said one-way brake and the other carrier rotates with the output member and wherein the ring gear of the first gear set and the sun gear of the second set rotate together; a second forward reduction ratio with said first clutch engaged and said second released wherein the one-way brake frees the formerly stationary carrier for forward rotation and said cojointly rotatable first ring gear and second sun gear are held stationary by a different brake connection, and a forward direct drive ratio with both of said clutches engaged wherein both planetary sets are locked up, said clutch and brake connections being characterized by one of said clutch connections being engaged during first and second forward reduction and direct drive ratios, the second clutch being engaged during direct drive ratio, the said one-way brake connection being effective only during the first forward reduction ratio, and a second brake connection being engaged only during the second forward reduction ratio.

6. A variable speed transmission for an automotive vehicle comprising a housing, axially aligned power input and power output members, a pair of axially aligned planetary gear sets interposed therebetween, each having a concentrically rotating interengaging sun, ring and planet gears and a planet gear carrier, means for effecting three progressive forward drive ratios between said input and output members, said means including two selectively engageable friction clutches and two selectively engageable friction brake connections, including a one-way brake for one of said carriers, said clutches and said brake connections being adapted upon successive operation to provide a first forward reduction ratio with a first of said clutches engaged and the second released wherein one of said clutches is engaged and the one-way brake is effective, the sun gear of the first gear set rotates at input speed and the ring gear of the second gear set at output speed, the carrier of the second gear set is held stationary by said one-way brake and the first set carrier rotates with the output member and wherein the ring gear of the first gear set and the sun gear of the second set rotate cojointly; a second reduction ratio with said first clutch engaged and said second released wherein said one-way brake connection for said stationary carrier is ineffective and the second brake connection is engaged to hold said cojointly rotatable first ring gear and second sun gear stationary; and a direct drive ratio with both of said clutches engaged wherein both of said clutches are engaged and both of said brakes are released.

7. A variable speed transmission for an automotive vehicle comprising a housing, axially aligned power input and power output members, a pair of axially aligned planetary gear sets interposed therebetween, each having a concentrically rotatable interengaging sun, ring and planet gears and a planet gear carrier, means for effecting two progressive forward ratios between said input and output members, said means including two selectively engageable clutches and a plurality of brake connections, including a one-way brake, adapted upon successive operation to provide a first forward reduction ratio with a first of said clutches engaged and the second released wherein the sun gear of the first gear set is driven at input speed and the ring gear of the second gear set at output speed, the carrier of the second set is held against reverse movement only by said one-way brake connection and the first set carrier rotates at output speed, and wherein the ring gear of the first gear set and the sun gear of the second gear set rotate cojointly; and a second forward reduction ratio with said first clutch remaining engaged and said second remaining released and wherein said stationary carrier is freed by said one-way brake to rotate forwardly and the first ring gear is held stationary by a second of said brake connections.

8. A variable speed transmission for an automotive vehicle comprising a housing, axially aligned power input and power output members, a pair of axially aligned planetary gear sets interposed therebetween each having a rotatable interengaging sun, ring and planet gears, and a planet gear carrier, means for effecting a plurality of drive ratios between said input and output members, said means including two selectively gradually engageable clutches and a plurality of brake connections adapted upon successive operation to provide a first forward reduction ratio with a first of said clutches engaged and the second released wherein the sun gear of the first gear set is driven at input speed and the ring gear of the second gear set at output speed, the carrier of the second set is held stationary against reverse rotation only by one of said brake connections and the other carrier rotates with the output member and wherein the ring gear of the first gear set and the sun gear of the second set rotate together; a second forward reduction ratio with said first clutch engaged and said second released wherein such stationary carrier is free to rotate forwardly and said ring gear of the first set is held stationary, a forward direct drive ratio with both of said clutches engaged wherein both planetary sets are locked up by said clutch connections, and a reverse reduction ratio with said first clutch released and said second engaged wherein one of said planetary sets is ineffective to modify the drive ratio while in the other the carrier is held stationary against rotation by another of said brake connections, the sun gear is driven at input speed and the ring gear at output speed.

9. A variable speed transmission for an automotive vehicle comprising a housing, axially aligned power input and power output members, first and second axially aligned planetary gear sets interposed therebetween, each having rotatable interengaging sun, ring and planet gears, and a planet gear carrier, means for effecting three progressive forward ratios and a reverse drive ratio between said input and output members, said means including two selectively engageable clutches, a one-way brake, and a pair of brake connections adapted upon successive operation to provide a first forward reduction ratio with a first of said clutches engaged and the second released wherein the sun gear of the first gear set is driven at input speed and the ring gear of the second set at output speed, the second set carrier is held stationary by said one-way brake and the other carrier rotates at output speed, and wherein the ring gear of the first set and sun gear of the second set rotate conjointly; a second forward reduction ratio with said first clutch engaged and said second released wherein said one-way brake is ineffective to hold said stationary carrier and said conjointly rotatable first ring gear and second sun gear are held stationary by one of said brake connections; a forward direct drive ratio with both of said clutches engaged wherein both planetary sets are locked up; and a reverse reduction ratio with said first clutch released and said second engaged wherein one of said planetary sets is ineffective to modify the drive ratio while in the other the carrier is held stationary, the sun gear is driven at input speed, the ring gear is driven at output speed, and said stationary carrier is held against rotation in either direction by the other of said brake connections.

10. A variable speed transmission for an automotive vehicle comprising a housing, axially aligned power input and power output members, first and second axially aligned planetary gear sets interposed therebetween each having rotatable interengaging sun, ring and planet gears and a planetary gear carrier, means for effecting a plurality of drive ratios between said input and output members, said means including two selectively engageable clutches and a plurality of brake connections adapted upon successive operation to provide a first forward reduction ratio with one of said clutches engaged, thereby coupling the ring gear of the first gear set and the sun gear of the second set, the other clutch being released, wherein the sun gear of the first gear set is driven at input speed and the ring gear of the second set at output speed, the carrier of the second set is held stationary and the other carrier rotates with the output member and wherein the ring gear of the first set and the sun gear of the second set rotate together; a second forward reduction ratio with said one clutch engaged and the other released wherein such stationary carrier is released and the ring gear of the first set is held stationary, a forward direct drive ratio with both of said clutches engaged wherein both planetary sets are locked up, and a reverse reduction ratio with said other clutch engaged, thereby coupling the power input member to the sun gear of the second gear set, the said one clutch being released, wherein one of said planetary sets is ineffective to modify the drive ratio while in the other the carrier is held stationary, the sun gear is driven at input speed and the ring gear at output speed, one clutch connection being adapted to drive the second sun gear at input speed in both direct drive and reverse reduction ratios.

11. A variable speed transmission comprising a housing, input and output shafts journalled in the housing, first and second planetary gear sets, each set comprising a ring gear, a sun gear, planet pinions meshing with the ring gear and the sun gear and a carrier rotatably supporting the planet gears, the ring gear of the first gear set and sun gear of the second gear set being interconnected, the input shaft being connected to the sun gear of the first set, the output shaft being connected to the ring gear of the second set and to the carrier of the first set, a one-way brake for holding the carrier of the second set to hold the same against only that reverse rotation which would otherwise occur upon driving of the first sun gear and consequent reverse rotation of the said interconnected first ring and second sun gears, whereby a one-way low speed forward drive ratio is obtained; and a two-way brake for holding the first ring gear stationary, whereby a shift to a higher speed forward drive is obtained upon application of the two-way brake and without the necessity of releasing the one-way carrier brake.

12. A variable speed transmission comprising a housing, input and output shafts journalled in the housing, first and second planetary gear sets, each set comprising a ring gear, a sun gear, planet gears meshing with the ring gear and the sun gear and a carrier rotatably supporting the planet gears, the ring gear of the first set and sun gear of the second set being interconnected, the input shaft being connected to the sun gear of the first set, the output shaft being connected to the ring gear of the second set and to the carrier of the first set, a one-way brake for holding the carrier of the second set to hold the same against only that reverse rotation which would otherwise occur upon driving of the first sun gear and consequent reverse rotation of the interconnected first ring and second sun gears, whereby a one-way low speed forward drive ratio is obtained, and a supplementary two-way brake for the carrier applicable to supplement the holding action of the one-way carrier brake and effective to cause a two-way low speed forward drive ratio to be obtained.

13. A variable speed transmission for a self-propelled vehicle comprising a housing, axially aligned power input and output members, first and second axially aligned planetary gear sets interposed therebetween, each having ring, sun, and planet gears, the planet gears each meshing with said ring and sun gears and being mounted on a planet gear carrier, means for effecting a plurality of drive ratios between said input and output members, said means including two selectively engageable clutches and a plurality of brake connections adapted upon successive operation to provide a first forward reduction ratio with one of said clutches engaged and the other released wherein the sun gear of the first gear set is driven at input speed and the ring gear of the second set at output speed, the carrier of the second set is held stationary and the first carrier rotates with the output member, wherein the sun gear of the second set is drivingly connected to the ring gear of the first set; a second forward reduction ratio with one clutch engaged and the other released, wherein such stationary carrier is released to rotate forwardly and the ring gear of the first set is held stationary; a forward direct drive with both of said clutches engaged wherein both gear sets are locked up, and a reverse reduction ratio with said other clutch engaged, thereby coupling the power input member to the sun gear of the second gear set, the said one clutch being released, wherein the first gear set is ineffective to modify the drive ratio while the second carrier is held stationary, the second sun gear is driven at input speed and the second ring gear at output speed, said clutch connections being characterized by one clutch connection adapted to drive the second sun gear at input speed in both direct drive and reverse reduction ratio.

14. In the combination set forth in claim 13, a brake drum connected to said second carrier on one side of said output ring gear, means on the other side of said output ring gear supporting the brake drum on the stationary housing structure and overrunning means to prevent backward rotation of said brake drum.

15. A variable speed transmission for an automotive vehicle comprising a housing, axially aligned power input and power output members, a pair of axially aligned planetary gear sets interposed therebetween each having rotatable interengaging sun, ring and planet gears, the planet gears meshing with said sun and ring gears, and a planet gear carrier, means for effecting a plurality of drive ratios between said input and output members, said means including two selectively engageable clutches and a plurality of brake connections adapted upon successive operation to provide a first forward reduction ratio with a first of said clutches engaged and the second released wherein the sun gear of the first gear set is driven at input speed and the ring gear of the second set at output speed, the carrier of the second set is held stationary and the first carrier rotates with the output member and wherein the first ring gear and second sun gear rotate together; a second forward reduction ratio with said first clutch engaged and said second released wherein such stationary carrier is released and the first ring gear is held stationary; a forward direct drive ratio with both of said clutches engaged wherein both planetary sets are locked up; and a reverse reduction ratio with said first clutch released and said second engaged to couple the power input member to the sun gear of the second gear set, wherein the first gear set is without effect in modifying the drive ratio while in the second set the carrier is held stationary, the gun gear is driven at input speed and the ring gear at output speed, said clutch and brake connections being characterized by one of said clutch connections being engaged during first and second forward reduction and direct drive ratios, the second clutch being engaged during direct and reverse reduction ratios, one of said brake connections being engaged during the first forward reduction and the reverse reduction ratios and a second brake connection being engaged during the second forward reduction ratio.

16. A variable speed transmission for an automotive vehicle comprising a housing, axially aligned power input and power output members, first and second axially aligned planetary gear sets interposed therebetween, each having rotating interengaging sun, ring and planet gears, and a planet gear carrier, means for effecting three progressive forward and reverse drive ratios between said input and output members, said means including two selectively engageable friction clutches and two selectively engageable friction brake connections adapted upon successive operation to provide a first forward reduction ratio with a first of said clutches engaged and the second released wherein one each of said clutch and brake connections is engaged, the sun gear of the first set is driven at input speed and ring gear of the second set at output speed, the second carrier is held stationary and the first carrier rotates with the output member and wherein the first ring gear and second sun gear rotate conjointly; a second reduction ratio with said first clutch engaged and said second released wherein said engaged brake connection for said stationary carrier is released and the second brake connection is engaged to hold the first ring gear stationary; a direct drive ratio wherein both of said clutches are engaged and both of said brakes are released; and a reverse reduction ratio with said first clutch released and said second engaged, thereby coupling the power input member to the sun gear of the second gear set, wherein said first speed clutch and second speed brake are released while the other clutch and brake connections are engaged to render the first planetary set ineffective to modify the drive ratio while in the second set the carrier is held stationary, the sun gear is driven at input speed and the ring gear at output speed.

17. A variable speed transmission for an automotive vehicle comprising a housing, axially aligned power input and power output members, first and second axially aligned planetary gear sets interposed therebetween, each having rotatable interengaging sun, ring and planet gears, and a planet gear carrier, means for effecting three progressive forward ratios and a reverse drive ratio between said input and output members, said means including two selectively engageable clutches and a plurality of brake connections adapted upon successive operation to provide a first forward reduction ratio with a first of said clutches engaged and the second released wherein the first sun gear is driven at input speed and the second ring gear at output speed, the carrier of the second set is held stationary and the other carrier rotates at output speed, and wherein the first ring gear and second sun gear rotate conjointly; a second forward reduction ratio with said first clutch engaged and said second released wherein said stationary carrier is released and the first ring gear is held stationary; a forward direct drive ratio with both of said clutches engaged wherein both planetary sets are locked up; and a reverse reduction ratio with said first clutch released and said second engaged, thereby coupling the sun and ring gears of the first gear set together, wherein the first of said planetary sets is ineffective to modify the drive ratio while in the second set the carrier is held stationary, the sun gear is driven at input speed and the ring gear at output speed.

18. A variable speed transmission for an automotive vehicle comprising a housing, axially aligned power input and power output members, a pair of axially aligned planetary gear sets interposed therebetween each having rotatable interengaging sun, ring and planet gears, and a planet gear carrier, means for effecting a plurality of drive ratios between said input and output members, said means including two selectively gradually engageable clutches and a plurality of brake connections adapted upon successive operation to provide a first forward reduction ratio with a first of said clutches engaged and the second released wherein the sun gear of the first gear set is driven at input speed and the ring gear of the second set at output speed, the carrier of the second set is held stationary and the other carrier rotates with the output member and wherein the first ring gear and the second sun gear rotate together; a second forward reduction ratio with said first clutch engaged and said second released wherein such stationary carrier is released and the first ring gear is held stationary; a forward direct drive ratio with both of said clutches engaged wherein both planetary sets are locked up and a reverse reduction ratio with said first clutch released and said second engaged, thereby coupling the sun and ring gears of the first gear set together, wherein the first of said planetary sets is ineffective to modify the drive ratio while in the second set the carrier is held stationary, the sun gear is driven at input speed and the ring gear at output speed, said clutch connections being characterized by one clutch connection adapted to drive the second sun gear at input speed in both direct drive and reverse ratios.

19. A variable speed transmission for an automotive vehicle comprising a housing, axially aligned power input and power output members, first and second axially aligned planetary gear sets interposed therebetween each having rotatable interengaging sun, ring and planet gears, and a planetary gear carrier, means for effecting a plurality of drive ratios between said input and output members, said means including two selectively gradually engageable clutches and a plurality of brake connections adapted upon successive operation to provide a first forward reduction ratio with a first of said clutches engaged, thereby coupling the input member to the sun gear of the first gear set, and the second clutch released wherein the sun gear of the first gear set is driven at input speed and the ring gear of the second set at output speed, the carrier of the second set is held stationary and the other carrier rotates with the output member and wherein the ring gear of the first set and sun gear of the second set rotate together; a second forward reduction ratio with said first clutch engaged and said second released wherein such stationary carrier is released and said first ring gear and second sun gear are held stationary; a forward direct drive ratio with both of said clutches engaged wherein both planetary sets are locked up; and a reverse reduction ratio with said first clutch released and said second engaged to couple the input member to the sun gear of the second gear set, wherein the first of planetary set is without effect in modifying the drive ratio while in the second set the carrier is held stationary, the sun gear is driven at input speed and the ring gear at output speed, said clutch and brake connections being characterized by one of said clutch connections being engaged during first and second forward reduction and direct drive ratios, the second clutch being engaged during direct drive and reverse reduction ratios, one of said brake connections being engaged during the first forward reduction and the reverse reduction ratios and a second brake connection being engaged during the second forward reduction ratio.

20. A variable speed transmission for an automotive vehicle comprising a housing, axially aligned power input and power output members, first and second axially aligned planetary gear sets interposed therebetween, each having rotating inter-engaging sun, ring and planet gears, and a planet carrier, means for effecting three progressive forward and a reverse drive ratio between said input and output members, said means including two selectively gradually engageable friction clutches and two selectively gradually engageable friction brake connections adapted upon successive operation to provide a first forward reduction ratio with a first of said clutches engaged and the second released wherein one each of said clutch and brake connections is engaged, the first sun gear is driven at input speed and the second ring gear at output speed, the second carrier is held stationary and the other carrier rotates with the output member and wherein the first ring gear and second sun gear rotate conjointly; a second reduction ratio with said first clutch engaged and said second released wherein said engaged brake connection for said stationary carrier is released and the second brake connection is engaged to hold said first ring gear and second sun gear stationary; a direct drive ratio with both of said clutches engaged wherein both of said clutches are engaged and both of said brakes are released; and a reverse reduction ratio with said first clutch released and said second engaged, thereby coupling the ring gear and carrier of the first gear set together, wherein said first speed clutch and second speed brake are released while the other clutch and brake connections are engaged to render the first of said planetary sets ineffective to modify the drive ratio, while in the second set the carrier is held stationary, the sun gear is driven at input speed and the ring gear at output speed.

21. A variable speed transmission for an automotive vehicle comprising a housing, axially aligned power input and power output members, first and second axially aligned planetary gear sets interposed therebetween, each having rotatable interengaging sun, ring and planet gears, and a planetary gear carrier, means for effecting three progressive forward ratios and a reverse drive ratio between said input and output members, said means including two selectively gradually engageable clutches and a plurality of gradually engageable brake connections adapted upon successive operation to provide a first forward reduction ratio with a first of said clutches engaged and the second released wherein the sun gear of the first gear set is driven at input speed and the ring gear of the second set at output speed, the second set carrier is held stationary and the other carrier rotates at output speed, and wherein the first set ring gear and second set sun gear rotate conjointly; a second forward reduction ratio with said first clutch engaged and said second released wherein said stationary carrier is released and said first set ring gear and second set sun gear are held stationary; a forward direct drive ratio with both of said clutches engaged wherein both planetary sets are locked up; and a reverse reduction ratio with said first clutch released and said second engaged, thereby coupling the ring gear and carrier of the first gear set together, wherein the first of said planetary sets is ineffective to modify the drive ratio while in the second set the carrier is held stationary, the sun gear is driven at input speed and the ring gear at output speed.

22. In a power transmission, in combination, a driving shaft; a driven shaft; a planetary gear unit including a sun gear connected to said driving shaft, a ring gear, and a planet carrier connected to said driven shaft and having pinions thereon interposed between said gears and intermeshing therewith; another planetary gear unit including a sun gear connected to the ring gear of said first mentioned planetry gear unit, a ring gear in drive relation with said driven shaft and a planet carrier having pinions thereon interposed between the gears of said second mentioned planetary gear unit and intermeshing therewith; and a means for holding the carrier of said second mentioned planetary gear unit to provide a reaction member.

References Cited in the file of this patent

UNITED STATES PATENTS

| 2,251,625 | Hale | Aug. 5, 1941 |
| 2,764,902 | Cartwright | Oct. 2, 1956 |